United States Patent
Raju et al.

(10) Patent No.: US 12,469,280 B2
(45) Date of Patent: Nov. 11, 2025

(54) DISPLAY PHOTO UPDATE RECOMMENDATIONS

(71) Applicant: Motorola Mobility LLC, Chicago, IL (US)

(72) Inventors: Srikanth Raju, Sahakaranagar (IN); Renuka Prasad Herur Rajashekaraiah, Bangalore (IN); Amit Kumar Agrawal, Bangalore (IN); Rahul Bharat Desai, Hoffman Estates, IL (US)

(73) Assignee: Motorola Mobility LLC, Chicago, IL (US)

( * ) Notice: Subject to any disclaimer, the term of this patent is extended or adjusted under 35 U.S.C. 154(b) by 377 days.

(21) Appl. No.: 17/957,398

(22) Filed: Sep. 30, 2022

(65) Prior Publication Data

US 2024/0112464 A1 Apr. 4, 2024

(51) Int. Cl.
*G06V 20/30* (2022.01)
*G06F 3/0482* (2013.01)
*G06V 10/774* (2022.01)
*G06V 20/00* (2022.01)
*H04N 23/63* (2023.01)

(52) U.S. Cl.
CPC ............ *G06V 20/30* (2022.01); *G06F 3/0482* (2013.01); *G06V 10/7747* (2022.01); *G06V 20/35* (2022.01); *H04N 23/633* (2023.01)

(58) Field of Classification Search
CPC . G06V 10/7747; G06F 3/0482; H04N 23/633
See application file for complete search history.

(56) References Cited

U.S. PATENT DOCUMENTS

2019/0138656 A1* 5/2019 Yang ..................... G06N 3/045
2019/0379750 A1* 12/2019 Zamora Duran ........ G06N 5/02

OTHER PUBLICATIONS

"r/ Google Photos", Reddit.com, Reddit [retrieved Aug. 25, 2022]. Retrieved from the Internet <https://www.reddit.com/r/googlephotos/comments/mtl6bo/how_does_google_photos_automatically_choose_album/>., 11 Pages.
Google , "Create & edit photo albums", Google Photos Help, Google [retrieved Aug. 25, 2022]. Retrieved from the Internet <https://support.google.com/photos/answer/6128849?hl=en&co=GENIE.Platform%3DAndroid#zippy=%2Cchange-your-cover-photo>., 3 Pages.

* cited by examiner

*Primary Examiner* — Edward Park
(74) *Attorney, Agent, or Firm* — FIG. 1 Patents

(57) ABSTRACT

In aspects of display photo update recommendations, a catalyst is identified for updating a display photo of a user on a social media website. Further, a first collection of photos that are associated with the catalyst are retrieved from a photo gallery maintained in memory of a computing device. Using a machine learning model trained on a second collection of display photos utilized by connections of the user on the social media website, one or criteria are determined for display photos. Moreover, candidate display photos that satisfy the one or more criteria are identified from the first collection of photos and output to the photo gallery.

20 Claims, 8 Drawing Sheets

DISPLAY PHOTO UPDATE RECOMMENDATIONS

BACKGROUND

Today's modern devices provide users with a variety of different opportunities for capturing multimedia content. For instance, a typical smart device (e.g., a smartphone) includes image capture capability for capturing still images and video, with an extensive selection of camera features and settings. Many modern smartphone cameras are capable of capturing content with similar quality to professional cameras and accordingly smartphone photography is more accessible than ever. Given the accessibility and quality of today's smartphone cameras, users often capture a plethora of photos when a photo opportunity presents itself in the hopes of capturing a suitable display photo for a social media website.

BRIEF DESCRIPTION OF THE DRAWINGS

Aspects of display photo update recommendations are described with reference to the following Figures. The same numbers may be used throughout to reference similar features and components that are shown in the Figures. Further, identical numbers followed by different letters reference different instances of features and components described herein.

DETAILED DESCRIPTION

Figure 1:
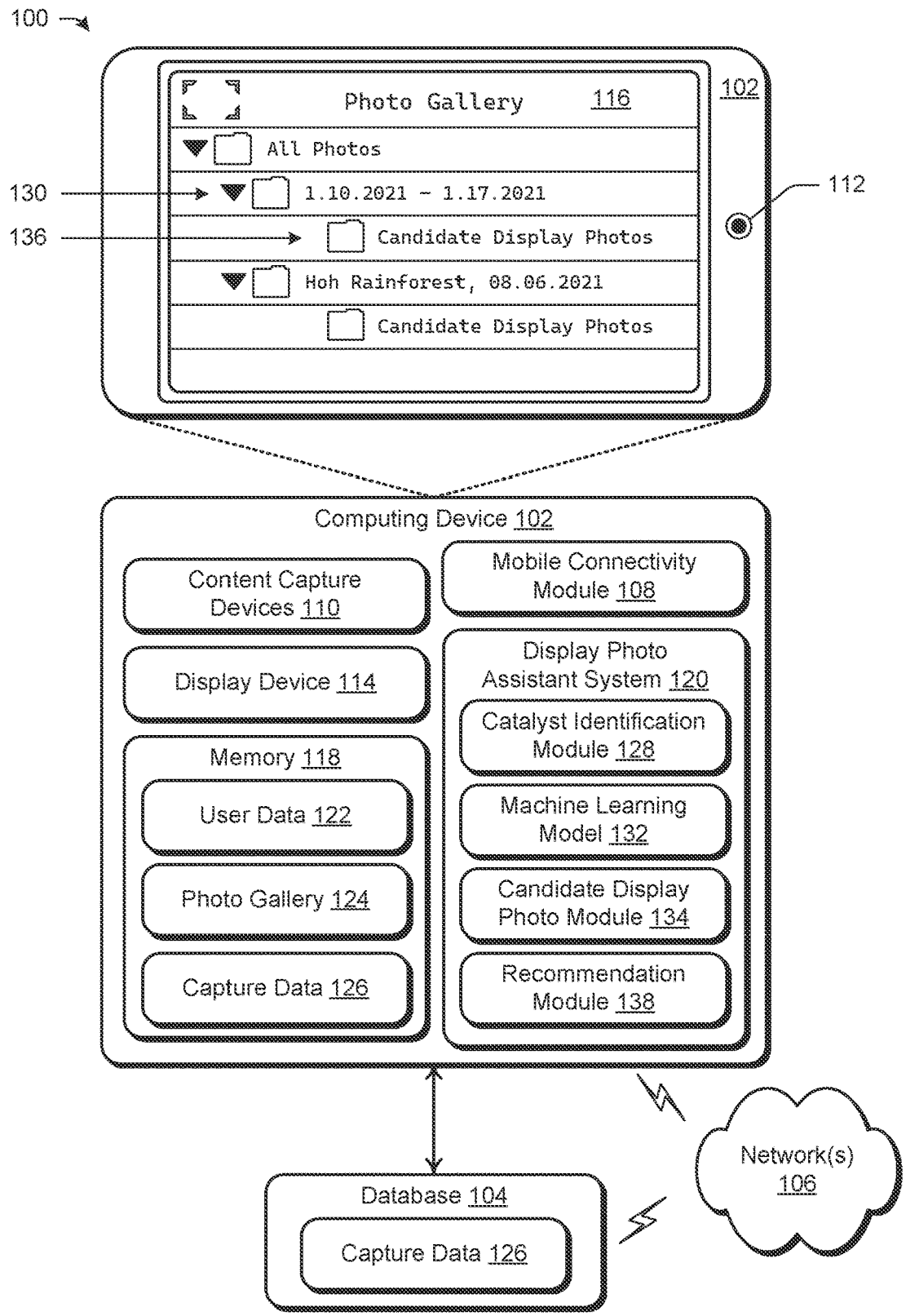
FIG. 1 illustrates an example environment in which aspects of display photo update recommendations can be implemented.

Techniques for display photo update recommendations are described herein as implemented by a display photo assistant system of a computing device. The computing device includes a memory to maintain a photo gallery containing photos captured by camera(s) of the computing device, photos saved and/or downloaded to the computing device, and the like. In accordance with the described techniques, the display photo assistant system identifies a catalyst for updating a display photo of a user on a social media website. Broadly speaking, the catalyst is an event that typically inspires or motivates a user to update his or her display photo on the social media website. Based on the catalyst, the display photo assistant system is further configured to identify a first collection of photos from the photo library that are related to the catalyst. In one example, for instance, the catalyst is a threshold number of photos detected in the photo library that were captured at a particular location. Notably, capturing or saving a large number of photos at a particular location typically indicates a significant or unusual experience, which often leads to a display photo update on the social media website. Given this, the display photo assistant system retrieves a first collection of photos from the photo library that were captured at the particular location.

Generally, a machine learning model is leveraged by the display photo assistant system to determine criteria for display photos. For example, a second collection of photos is retrieved from the social media website to be used as training data to train the machine learning model to determine the criteria for display photos. Notably, the second collection of photos includes display photos utilized by connections of the user (e.g., "friends," accounts the user is "following," accounts the user is "followed" by, etc.) on the social media website. In one or more implementations, the machine learning model learns criteria for display photos associated with connections of the user that perform well on the social media website based on social media statistics, e.g., a number of "likes," "shares," "comments," and "views." Any one of a variety of machine learning aspects can be utilized to train the machine learning model to determine the criteria, including but not limited to neural networks, deep learning models, reinforcement learning models, machine learning scoring models, etc. By training the machine learning model on the display photos utilized by connections of the user on the social media website, the criteria for display photos are tailored to an audience of the user on the social media website.

The display photo assistant system is further configured to identify candidate display photos from the first collection of photos that satisfy the criteria. To do so, the display photo assistant system compares capture data associated with individual photos in the first collection of photos to the criteria. In one or more implementations, the capture data is photo metadata describing various types of information relating to individual photos in the photo gallery, including configuration settings used by a camera that captured a respective individual photo, such as device orientation, camera orientation, and brightness settings. Additionally or alternatively, the capture data includes time and location information associated with the respective individual photo, such as a geolocation, a time of day, a date, and weather conditions. Accordingly, the display photo assistant system identifies one or more candidate display photos from the first collection of photos that satisfy a largest number and/or at least a threshold number of the criteria based on the capture data.

Once identified, the candidate display photos are output to the photo gallery for storage. By way of example, the display photo assistant system creates a folder in the photo library that contains the first collection of photos and further titles the folder based on the catalyst. Further, the display photo assistant system creates a sub-folder containing the candidate display photos identified from the first collection of photos. In this way, the user can navigate to the photo library, and browse the candidate display photos associated with the catalyst. Upon receiving user input selecting one of the candidate display photos for upload to the social media website, the display photo assistant system is further employed to generate a caption recommendation for the selected candidate display photo. To do so, the display photo assistant system performs a web-based search including search terms that are based on or related to the capture data of the selected candidate display photo, the catalyst, and/or user data describing information associated with the user of the computing device. Once generated, the selected candidate display photo and the corresponding caption recommendation are output to the social media website for upload.

Accordingly, the techniques described herein automatically and without human intervention identify a catalyst for updating a display photo of a user on a social media website, identify candidate display photos associated with the catalyst that are likely to perform well as display photos on the social media website based on the user's audience, and generate relevant captions for the candidate display photos. This contrasts with conventional techniques which typically require a user to manually perform the tedious task of inspecting a large number of photos to identify a suitable display photo for a social media website.

While features and concepts of the described techniques for display photo update recommendations can be implemented in any number of different devices, systems, environments, and/or configurations, implementations of the techniques for display photo update recommendations are described in the context of the following example devices, systems, and methods.

FIG. 1 illustrates an example environment 100 in which aspects of display photo update recommendations can be implemented. The environment 100 includes a computing device 102 and a database 104 that are interconnectable via network(s) 106. In this particular example, the computing device 102 represents a portable device that can be carried by a user, such as a smartphone or a tablet device. These examples are not to be construed as limiting, however, and the computing device 102 can be implemented in a variety of different ways and form factors such as a digital camera, laptop computer, desktop computer, webcam, a docked mobile device connected to a monitor, and so forth. Example attributes of the computing device 102 are discussed below with reference to the device 700 of FIG. 7.

The computing device 102 includes various functionality that enables the computing device 102 to perform different aspects of display photo update recommendations discussed herein, including a mobile connectivity module 108, content capture devices 110 including cameras 112, a display device 114 including a user interface 116, a memory 118, and a display photo assistant system 120. Notably, the memory 118 maintains user data 122, a photo gallery 124, and capture data 126. The mobile connectivity module 108 represents functionality (e.g., logic and hardware) for enabling the computing device 102 to interconnect with other devices, storage systems, and/or networks, such as the database 104 and the network(s) 106. The mobile connectivity module 108, for instance, enables wireless and/or wired connectivity of the computing device 102.

The content capture devices 110 are representative of functionality to enable various types of media to be captured via the computing device 102, such as visual media and audio media. In the illustrated example, the content capture devices 110 include photo/video capture devices such as cameras 112 and audio capture devices such as microphones. In one or more implementations, the cameras 112 include a first camera, e.g., a front-facing camera used for capturing self-portrait content such as one or more "selfies," and a second camera, e.g., a rear-facing camera. The content capture devices 110, however, can include a variety of other devices that capture various types of media in accordance with the implementations discussed herein. The content capture devices 110, for instance, include not only hardware for capturing media but also logic (e.g., drivers, firmware, etc.) for operating and configuring operation of the associated content capture devices 110. The display device 114 represents functionality (e.g., hardware and logic) for enabling visual output via the computing device 102, e.g., via the user interface 116.

The user data 122 is maintained in the memory 118 and includes various information associated with a user (e.g., an owner) of the computing device 102 that is gleaned from use of software applications of the computing device 102 over time. In one or more implementations, the user data 122 includes information identifying a significant event associated with the user. In various examples, the significant event is a significant date (e.g., a birthday, an anniversary, date for a job interview) which can be gleaned at least partially from application data of a calendar application, for instance. In other examples, the significant event can be a travel event gleaned from application data of an airline application, for instance. In yet another example, the significant event can be a gathering event (e.g., a wedding, a ceremony, a family reunion, graduation etc.) gleaned at least partially from application data of a calendar application and/or from application data of a messaging application. It is to be appreciated that the user data 122 can include any suitable information associated with the user without departing from the spirit or scope of the described techniques.

The photo gallery 124 is also maintained in the memory 118 and includes various media such as photos and videos, which can be captured by the cameras 112 and/or audio capture devices of the computing device 102. Additionally or alternatively, the photos and videos may be captured by other devices, transmitted (e.g., over the network(s) 106) to the computing device 102, and subsequently saved to the photo gallery 124. In accordance with the described techniques, individual photos in the photo gallery 124 are associated with and/or include capture data 126 (e.g., metadata). In some examples, the capture data 126 includes configuration settings associated with capture of an individual photo such as whether a front-facing camera or a rear-facing camera captured the photo, a device orientation, aperture size, shutter speed, ISO, brightness setting, flash setting, night mode, exposure setting, image filter, contrast setting, etc. Additionally or alternatively, the capture data 126 includes time and location information associated with capture of an individual photo, such as a geolocation, time of day, date, weather conditions, etc. Furthermore, the capture data 126 can include demographic information associated with the user or owner of the device that captured an individual photo such as age, gender, nationality, etc. Moreover, the capture data 126 can include feature data describing features depicted in an individual photo, such as pose information including facial expressions, hand gestures, and body poses associated with human figures depicted in the individual photo, a number of human figures depicted in the individual photo, a background depicted in the individual photo, etc.

In some implementations, the capture data 126 is stored locally within the memory 118 of the computing device 102. Additionally or alternatively, the capture data 126 is stored in a remote database 104, e.g., maintained by server device (s) of a service provider. In accordance with the described techniques, the computing device 102 is configured to communicate with the remote database 104 to exchange information (e.g., the capture data 126) between the computing device 102 and the database 104. While in the illustrated example the database 104 is depicted as connected to the computing device 102 via network(s) 106, in various examples the computing device 102 and the database 104 are connectable via wired and/or wireless connectivity. In a wireless scenario, the computing device 102 and the database 104 are connected utilizing any suitable wireless protocol, such as Wi-Fi Direct, Bluetooth™ (including Bluetooth™ Low Energy (BLE), ultra-wideband (UWB), Near Field Communication (NFC)), LTE direct, NR sidelink, and so forth.

Thus, in implementations in which an individual photo or video is captured by the content capture devices 110 of the computing device 102, the computing device 102 is configured to store the capture data 126 locally in the memory 118 and communicate the capture data 126 to the database 104 for storage. In this way, the capture data 126 associated with photos captured by the cameras 112 of the computing device 102 can be accessed and utilized by other users of the service provider to implement techniques described herein. Notably, the remote database 104 includes capture data 126 of photos and videos captured by devices other than the computing device 102. In this way, when the computing device 102 stores a new photo in the photo gallery 124 for which capture data 126 is not provided (e.g., the new photo was not captured by the content capture devices 110 of the computing device 102, but was rather transmitted to the computing device 102 and subsequently saved to the photo gallery 124), the computing device 102 can access the remote database 104 to obtain the capture data 126 associated with the new photo and store the capture data 126 locally in the memory 118 and/or utilize the capture data 126 to implement the techniques described herein.

In accordance with the described techniques, the display photo assistant system 120 is configured to identify, on behalf of a user, one or more candidate display photos for a social media website. To do so, a catalyst identification module 128 is employed to identify a catalyst for updating a display photo of a user on a social media website. The catalyst identification module 128 further retrieves a first collection of photos from the photo gallery 124 that are associated with the catalyst. In an example 130, for instance, the catalyst is a threshold number of photos detected in the photo gallery 124 that were captured during a particular time period (e.g., from January 10 to January 17), and the first collection of photos includes photos that were captured during the particular time period.

The display photo assistant system 120 further leverages a machine learning model 132 to determine one or more criteria for display photos. In general, the machine learning model 132 retrieves a second collection of display photos utilized by connections of the user on the social media website as training data. Based on the training data, the machine learning model learns criteria associated with high performing display photos based on social media statistics, such as "likes," "shares," "comments," and "views." The criteria for display photos is received by a candidate display photo module 134, which is implemented to identify one or more candidate display photos from the first collection of photos that satisfy the one or more criteria. In implementations, the candidate display photos are identified based on a comparison of the criteria to the capture data 126 associated with individual photos in the first collection of photos. By training the machine learning model on the display photos utilized by connections of the user on the social media website, the candidate display photo module 134 identifies candidate display photos that are tailored to an audience of the user.

The candidate display photo module 134 outputs the candidate display photos to the photo gallery 124, e.g., to be maintained in a folder of candidate display photos associated with the catalyst as shown at example 136. In this way, the user can browse and select a candidate display photo from the folder, and in response, the selected candidate display photo can be uploaded to the social media website as the user's display photo. In one or more implementations, a recommendation module 138 is employed to generate a caption recommendation for the selected candidate display photo, e.g., based on one or more of the capture data 126 of the selected candidate display photo, the catalyst, and the user data 122. Accordingly, the display photo assistant system 120 can output the selected candidate display photo and the caption recommendation to the social media website to be uploaded as the user's display photo and corresponding caption.

Having discussed an example environment in which the disclosed techniques can be performed, consider now some example scenarios and implementation details for implementing the disclosed techniques.

Figure 2:
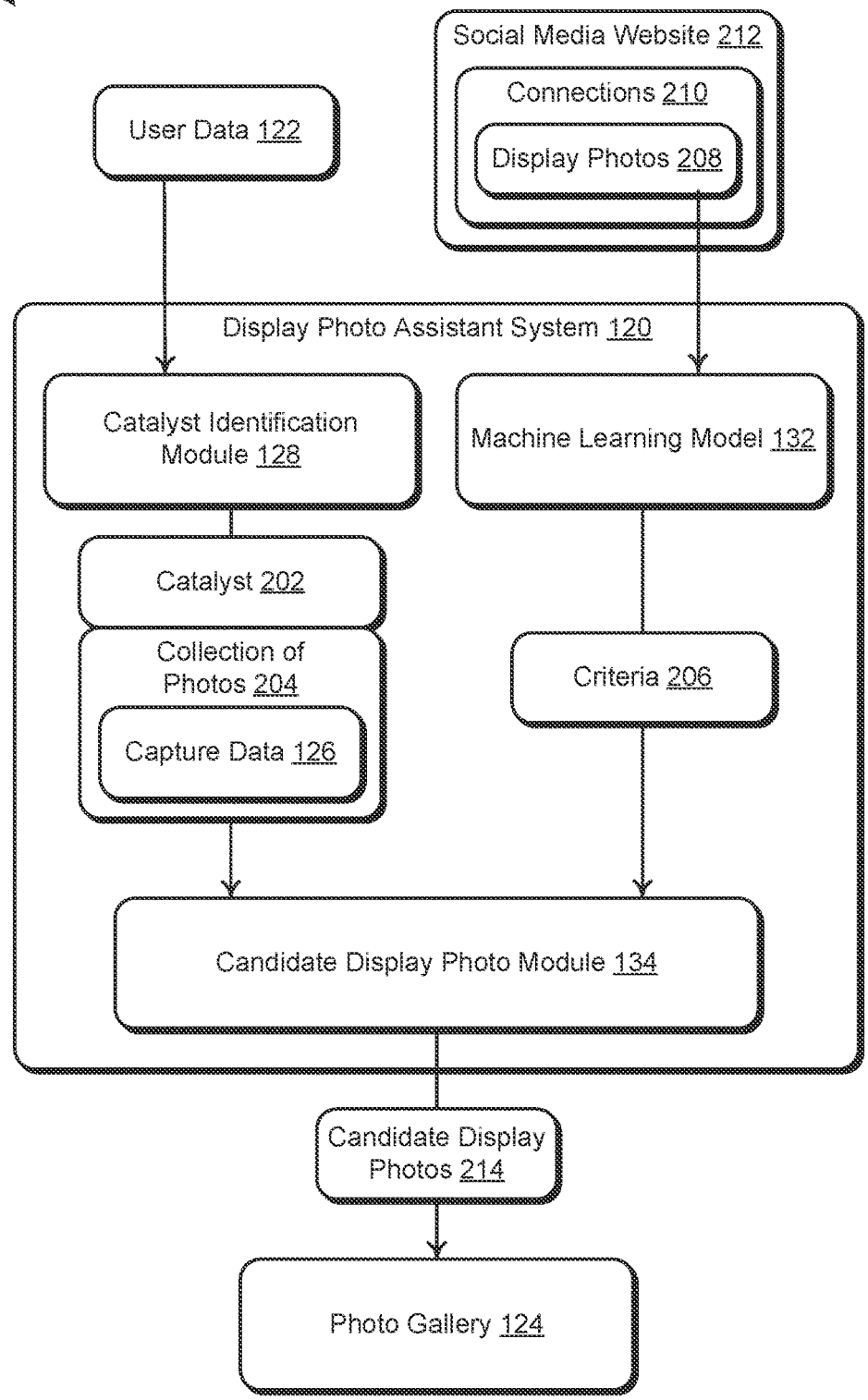
FIG. 2 depicts an example system in which aspects of display photo update recommendations can be implemented to identify candidate display photos.

FIG. 2 depicts an example system 200 in which aspects of display photo update recommendations can be implemented to identify candidate display photos. The catalyst identification module 128 is employed to identify a catalyst 202 for updating a display photo of a user on a social media website. Generally, the catalyst 202 is an event that typically inspires or motivates a user to update his or her display photo on the social media website. Broadly, the catalyst identification module 128 is also configured to retrieve a collection of photos 204 from the photo gallery 124 that are associated with the catalyst 202.

In at least one example, the catalyst identification module 128 identifies the catalyst 202 as a threshold number of photos in the photo gallery 124 that were captured during a particular time period, e.g., based on the capture data 126. The threshold number of photos, for instance, can be a deviation from an average number of photos taken during the particular time period. For example, the catalyst 202 is identified based on a number of photos being added to the photo gallery 124 over the course of seven days that is at least five times greater than the average number of photos added to the photo gallery 124 during any given seven day span. Notably, capturing or saving an unusually large number of photos typically means that a user is experiencing a significant or unusual event, which often leads to a display photo update on the social media website. In this example, the collection of photos 204 retrieved by the catalyst identification module 128 includes photos that were captured during the particular time period, as indicated by the capture data 126 of the individual photos in the collection of photos 204.

In another example, the catalyst identification module 128 identifies the catalyst 202 as a threshold number of photos detected in the photo gallery 124 that were captured at a particular location. In some variations, the catalyst 202 is further identified based on a time period during which the threshold number of photos were captured at the particular location. For example, the threshold number of photos can be a deviation from an average number of photos taken during the time period in which the photos were captured at the particular location, as discussed above. Further, the collection of photos 204 retrieved from the photo gallery 124 include photos captured at the particular location and optionally during the time period, as indicated by the capture data 126 of the individual photos in collection of photos 204.

In one or more implementations, the catalyst 202 is a significant event, which the catalyst identification module 128 identifies based on the user data 122. By way of example, the catalyst 202 can be a significant date, such as a birthday of the user, an anniversary of the user, a date for a job interview, etc. When the catalyst 202 is a significant date, the collection of photos 204 includes photos associated with the significant date, e.g., photos captured on the birthday of the user when the catalyst 202 is a birthday of the user, photos in the photo gallery 124 that include both the user and a romantic partner when the catalyst 202 is an anniversary. Further, the catalyst 202 can be a travel event, such as a vacation or a work trip that the user has recently taken. When the catalyst 202 is a travel event, the collection of photos 204 can include photos associated with the travel event, e.g., photos captured during the vacation or work trip. Additionally, the catalyst 202 can be a gathering event that the user has recently attended, such as a wedding, a ceremony, a family reunion, a concert, etc. When the catalyst 202 is a gathering event, the collection of photos 204 includes photos captured during the gathering event. In yet another example, the catalyst 202 can be a life event, such as the user buying a house, the user getting married, the user having a baby, etc. When the catalyst 202 is a life event, the collection of photos 204 includes photos associated with the life event, e.g., photos taken at a location associated with a new permanent residence of the user when the catalyst 202 is the user buying a house.

The catalyst 202, in some implementations, is a threshold amount of time passing since the user last updated a display photo on the social media website. In some examples, the threshold time is user-specified via application settings of an application that implements the display photo assistant system 120. Further, different time periods may be specified for different social media websites, e.g., indicating a desire to change a display photo every thirty days for a business networking social media website and indicating a desire to change a display photo every sixty days for a personal social media website. Given this, the collection of photos 204 includes photos that were captured during the threshold amount of time, e.g., since the user last updated his or her display photo. While examples of the catalyst 202 are discussed herein, the examples are not to be construed as limiting. Rather, it is to be appreciated that the catalyst 202 can include any other indicia for updating a display photo without departing from the spirit or scope of the described techniques.

Furthermore, a machine learning model 132 is leveraged to determine criteria 206 for display photos. To do so, the machine learning model 132 retrieves display photos 208 associated with connections 210 of the user (e.g., "friends," accounts the user is "following," accounts the user is "followed" by, etc.) on the social media website 212. In general, the display photos 208 are utilized as training data to train the machine learning model 132 to determine criteria 206 for display photos that typically lead to high performing social media statistics. In this way, the display photo assistant system 120 can identify candidate display photos that are tailored to an audience of the user. Any one of a variety of a variety of machine learning aspects can be utilized by the machine learning model 132 to determine the criteria 206, including but not limited to neural networks, deep learning models, reinforcement learning models, machine learning scoring models, etc.

In one specific example, the machine learning model 132 is a machine learning scoring algorithm that assigns scores to attributes extracted from the display photos 208. Given an example display photo 208, for instance, the machine learning model 132 extracts attributes from the example display photo 208 and ranks them based on prominence, importance, etc. For example, the attributes are identified and ranked based on the capture data 126 of the example display photo 208, the caption of the example display photo 208, comments associated with the example display photo 208, and/or features depicted in the example display photo 208. In various examples, attributes of the example display photo 208 include facial expressions depicted in the example display photo 208, hand gestures depicted in the example display photo 208, a number of individuals depicted in the example display photo 208, an orientation of a camera 112 (e.g., front-facing or rear-facing) that captured the example display photo 208, an orientation of a device (e.g., portrait or landscape) that captured the example display photo 208, a particular background depicted in the example display photo 208, etc. The machine learning model 132 then assigns a score to the example display photo 208 based on social media statistics. For example, the example display photo 208 is assigned a higher score if the example display photo 208 has more "likes," "shares," "comments," "views," etc.

In accordance with this example, the machine learning model 132 distributes the score among the highest ranked attributes, e.g., the attributes that are most prominent in the example display photo 208. Consider an example in which the example display photo 208 is given a score of ten. In this example, a score of five can be distributed to a highest-ranked attribute in the example display photo 208, a score of three can be distributed to a second-highest ranked attribute in the example display photo 208, and a score of two can be distributed to a third-highest ranked attribute in the example display photo 208.

The machine learning model 132 repeats this process for each of the display photos 208 and combines the scores. Consider an example in which a respective attribute is distributed a score for three separate display photos 208, in at least one implementation, the combined score for the respective attribute is an average of the three scores. The scores can be adjusted further based on the social media statistics and attributes associated with a previous display photo of the user, e.g., a display photo that was recommended by the display photo assistant system 120 in a previous iteration. By way of example, the machine learning model 132 lowers a score for an attribute of a previously used display photo that has low performing social media statistics. In this example, the machine learning model 132 is configured to identify the criteria 206 as the subset of the attributes having the highest combined scores.

In various examples, the criteria 206 includes human pose criteria (e.g., whether high performing display photos include facial expressions, hand gestures, etc.), background criteria (e.g., whether high performing display photos are captured indoors or outdoors, facing the sun or away from the sun, or with a particular background such as water, sky, buildings, etc.), device orientation criteria (e.g., whether high performing display photos are captured in a portrait mode or a landscape mode), camera orientation criteria (e.g., whether high performing display photos are captured with a front-facing camera or a rear-facing camera), human count criteria (e.g., whether high-performing display photos include only one individual or multiple individuals), clothing and style criteria, e.g., whether high performing display photos include humans dressed in suits, exercise attire, etc. Although examples of the criteria 206 are discussed herein, the examples are not to be construed as limiting. Rather, it is to be appreciated that the criteria 206 can include any other display photo attributes without departing from the spirit or scope of the described techniques.

The catalyst 202, the collection of photos 204 including the associated capture data 126, and the criteria 206 are provided as input to the candidate display photo module 134. Generally, the candidate display photo module 134 is configured to identify candidate display photos 214 from the collection of photos 204 that satisfy the criteria 206. By way of example, the candidate display photo module 134 analyzes the collection of photos 204 to identify candidate display photos 214 that include a largest number of the criteria 206. Additionally or alternatively, the candidate display photo module 134 analyzes the collection of photos 204 to identify candidate display photos 214 that include at least a threshold number of the criteria 206. Since the candidate display photos 214 are identified from the collection of photos 204, the candidate display photos 214 are related to the identified catalyst 202.

To identify the candidate display photos 214, the candidate display photo module 134 is configured to compare the capture data 126 of the individual photos in the collection of photos 204 to the criteria 206. By way of example, the criteria 206 can include camera orientation criteria indicating a front-facing camera, and device orientation criteria indicating a portrait mode. Therefore, the candidate display photo module 134 identifies candidate display photos 214 in the collection of photos 204 having capture data 126 indicating that the photos were captured with a front-facing camera and in a portrait mode. In another example, the criteria 206 can include background criteria indicating that high performing display photos are captured with cameras facing away from the sun. Therefore, the candidate display photo module 134 identifies candidate display photos 214 in the collection of photos 204 having capture data 126 indicating that a camera was facing away from the sun at the time a respective photo was captured, e.g., based on time and location information indicating a cardinal direction in which the sun was located when the respective photo was captured, and device orientation information indicating a cardinal direction in which the camera was facing when the respective photo was captured.

In another example, the criteria 206 includes human pose criteria indicating a smiling facial expression. Therefore, the candidate display photo module 134 identifies candidate display photos 214 in the collection of photos 204 having capture data 126 indicating that human figures with smiling facial expressions are depicted in the candidate display photos 214. In another example, the criteria 206 includes human count criteria indicating that high performing display photos include at least three human figures. As such, the candidate display photo module 134 identifies candidate display photos 214 in the collection of photos 204 having capture data 126 indicating that at least three human figures are depicted in the candidate display photos 214.

In accordance with the described techniques, the candidate display photo module 134 outputs the candidate display photos 214 to the photo gallery 124. By way of example, the photo gallery 124 is organized into folders or groupings, as shown in FIG. 1. In implementations, the display photo assistant system 120 creates a folder in the photo gallery 124 including the collection of photos 204. Further, the display photo assistant system 120 titles the folder based on the catalyst 202. In addition, the display photo assistant system 120 creates a sub-folder within the folder for the candidate display photos 214 associated with the catalyst 202. Accordingly, the candidate display photo module 134 outputs the candidate display photos 214 to the photo gallery 124 to be maintained in the sub-folder. In this way, the user can browse the photo gallery 124 to identify candidate display photos 214 for the social media website 212 associated with the catalyst 202.

In one or more variations, the candidate display photo module 134 identifies different sets of candidate display photos for different social media websites. Given a catalyst 202, for example, the machine learning model 132 is configured to determine multiple sets of criteria 206 for different social media websites of the user. Since the connections 210 of the user on the different social media websites are different, so too are the display photos 208 upon which the machine learning model 132 is trained. Due to this, a first set of criteria 206 determined for a first social media website is different than a second set of criteria 206 determined for a second social media website. Thus, the candidate display photo module 134 is configured to identify a first set of candidate display photos 214 for a first social media website and identify a second set of candidate display photos 214 for a second social media website. Notably, the first set of candidate display photos 214 includes at least one photo that is not included in the second set of candidate display photos 214, and vice versa. Further, the candidate display photo module 134 creates different sub-folders within the folder of the collection of photos 204 for each of the multiple social media websites, and outputs the different sets of candidate display photos 214 to the corresponding sub-folders in the photo gallery 124.

In one or more implementations, the candidate display photos 214 are further organized into categories within the sub-folder. For example, the display photo assistant system 120 creates additional sub-folders within the sub-folder of candidate display photos 214. The additional sub-folders, for instance, include candidate display photos 214 that share a common attribute and are titled based on the common attribute. In various examples, the display photo assistant system 120 creates a first additional sub-folder titled "solo photos" and includes the candidate display photos 214 depicting only the user, a second additional sub-folder titled "group photos" that includes the candidate display photos 214 depicting multiple human figures, and a third additional sub-folder titled "top poses" that includes the candidate display photos 214 depicting human figures with facial expressions, hand gestures, and/or body poses that satisfy the human pose criteria.

In one or more implementations, the display photo assistant system 120 periodically executes the machine learning model 132 to identify updated criteria for display photos. For example, the machine learning model 132 retrieves the display photos 208 associated with the connections 210 of the user on the social media website 212 at a time subsequent to determining the criteria 206. Therefore, one or more of the display photos 208 associated with the connections 210 of the user will have changed since the criteria 206 were determined. Accordingly, the machine learning model 132 determines an updated set of criteria based on the changed display photos 208.

In some examples, the display photo assistant system 120 determines that the display photo currently utilized by the user on the social media website 212 does not satisfy the updated criteria. For example, the candidate display photo module 134 compares the capture data 126 of the user's current display photo to the updated set of criteria. Based on the comparison, the candidate display photo module 134 determines that the current display photo of the user no longer satisfies a threshold number of the updated criteria. Given this, the catalyst identification module 128 identifies the catalyst 202 based on the determination that the currently utilized display photo does not satisfy the updated criteria. Further, the catalyst identification module 128 retrieves the collection of photos 204, which in this instance is individual photos in the photo gallery 124 that were captured since the user last updated his or her display photo. Moreover, the candidate display photo module 134 identifies additional candidate display photos 214 from the collection of photos 204 that satisfy the updated criteria. The additional candidate display photos 214 are then output to the photo gallery 124, as discussed above.

In addition or as an alternative to identifying the candidate display photos 214, the display photo assistant system 120 is configured to identify candidate posting photos. In contrast to the candidate display photos 214 which are optimal photos to be utilized as display or profile photos of the user on the social media website 212, the candidate posting photos are photos that are optimal for posting and/or sharing on the social media website 212. To do so, the display photo assistant system 120 operates in a similar manner to that described above. For example, the catalyst identification module 128 identifies the catalyst 202 for updating the display photo of the user on the social media website 212. In general, the catalyst 202 for updating the display photo is also a catalyst 202 for posting a photo on the social media website 212. Therefore, the catalyst 202 for posting a photo on the social media website 212 can be any of the example catalysts 202 for updating the display photo, as discussed above. Moreover, the catalyst identification module 128 retrieves the collection of photos 204 from the photo gallery 124 that are associated with the catalyst 202.

In implementations in which the display photo assistant system 120 is configured to identify candidate posting photos, the machine learning model 132 retrieves photos posted by the connections 210 of the user on the social media website 212 during a preceding time period (e.g., within the last five days), rather than display photos currently utilized by the connections 210 of the user. Further, the posted photos (e.g., rather than the display photos 208) are utilized as training data to train the machine learning model 132 to determine the criteria 206 for posted photos. Moreover, the candidate display photo module 134 identifies candidate posting photos from the collection of photos 204 that satisfy the criteria 206 for posted photos and outputs the candidate posting photos to the photo gallery 124. Notably, the criteria 206 for posted photos is different than the criteria 206 for display photos since the criteria 206 for posted photos is trained on different photos, and in turn, the candidate posting photos also include additional or different photos than the candidate display photos 214.

In one or more implementations, the candidate display photo module 134 is configured to output the candidate display photos 214 identified from the collection of photos 204, as well as the candidate posting photos identified from the collection of photos 204 to the photo gallery 124. In accordance with these implementations, the display photo assistant system 120 creates a folder in the photo gallery 124 that includes the collection of photos 204. Further, the display photo assistant system 120 creates a sub-folder within the folder for the candidate display photos 214, e.g., titled "Candidate Display Photos." Moreover, the display photo assistant system 120 creates an additional sub-folder within the folder for the candidate posting photos, e.g., titled "Candidate Posting Photos." In this way, the candidate display photo module 134 can output the candidate display photos 214 to be stored in the sub-folder and the candidate posting photos to be stored in the additional sub-folder.

Figure 3:
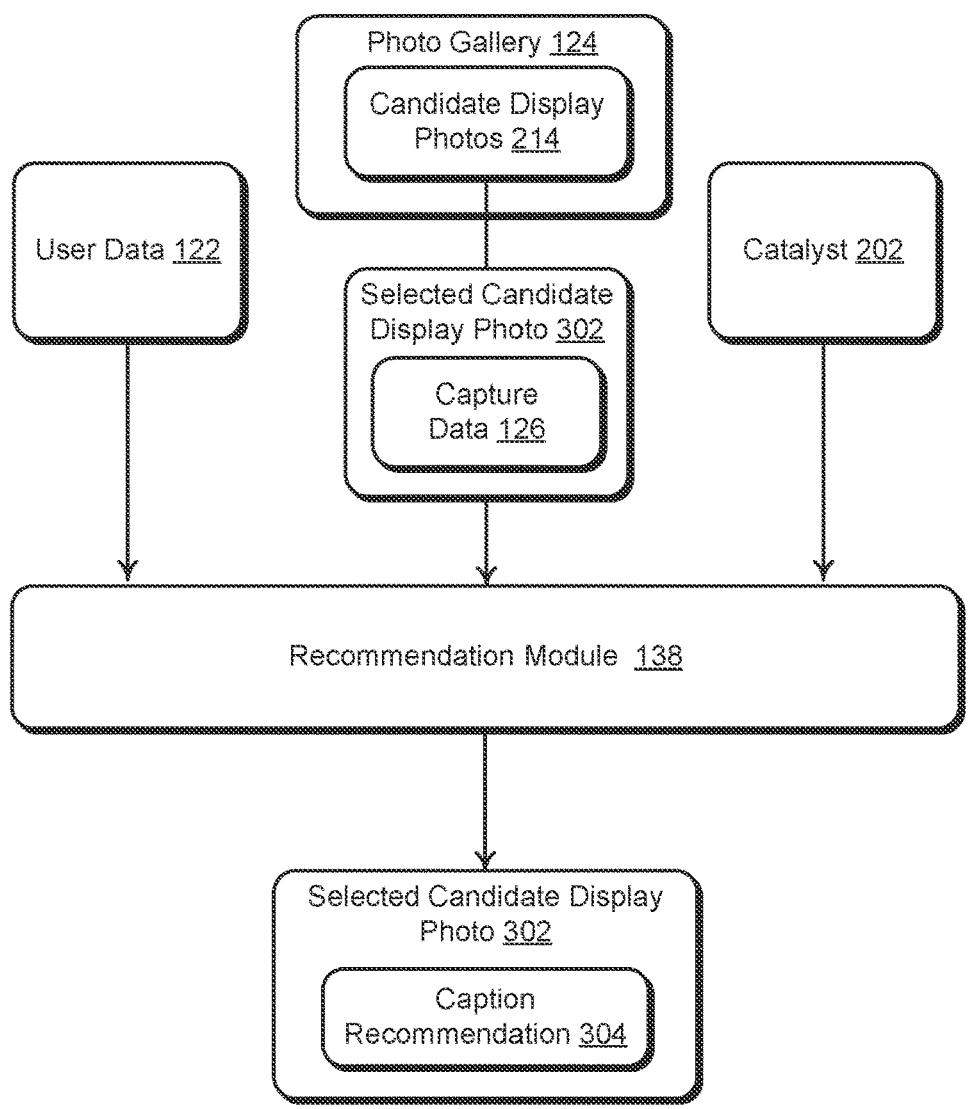
FIG. 3 depicts an example system in which aspects of display photo update recommendations can be implemented to generate a caption recommendation for a selected candidate display photo.

FIG. 3 depicts an example system 300 in which aspects of display photo update recommendations can be implemented to generate a caption recommendation for a selected candidate display photo. In accordance with the described techniques, the display photo assistant system 120 receives user input identifying a selected candidate display photo 302 to be output to the social media website 212 as the user's updated display photo. For example, the display photo assistant system 120 receives user input selecting one of the candidate display photos 214 from the sub-folder in the photo gallery 124.

The user data 122 associated with the user, the catalyst 202 for updating the display photo, and the selected display photo 302 including the corresponding capture data 126 are provided as input to the recommendation module 138. The recommendation module 138 is configured to generate a caption recommendation 304 based on any one or a combination of the user data 122, the capture data 126, and the catalyst 202. To do so, the recommendation module 138 performs a web-based search for a display photo caption including search terms that are based on the user data 122, the capture data 126, and/or the catalyst 202. Notably, the recommendation module 138 performs the web-based search and displays the caption recommendation 304 in the user interface 116 of the computing device 102 without user input apart from user input to select the candidate display photo 302.

In implementations in which the catalyst 202 is a threshold number of photos detected in the photo gallery 124 that were captured during a particular time period, the recommendation module 138 is configured to communicate with the memory 118 to retrieve user data 122 that identifies a significant event associated with the user during the particular time period. Given this, the recommendation module 138 performs a web-based search including search terms that relate to the significant event. In a specific example, for instance, the user data 122 indicates that an anniversary of the user falls during the particular time period in which the threshold number of photos were captured. Given this, the recommendation module 138 includes search terms that relate to anniversaries in the web-based search, such as "love," "anniversary," "husband," "wife," etc. Additionally or alternatively, the recommendation module 138 can further include additional search terms based on the capture data 126 of the selected candidate display photo 302. For instance, the capture data 126 may indicate that the selected candidate display photo 302 was captured at the beach. Thus, in addition to search terms related to anniversaries, the recommendation module 138 can include additional search terms relating to the beach, such as "beach," "waves," "ocean," etc. In this way, the caption recommendation 304 is related to the significant event that occurred during the particular time period as well as the scene depicted in the selected candidate display photo 302.

In implementations in which the catalyst 202 is a threshold number of photos detected in the photo gallery 124 that were captured at a particular location, the recommendation module 138 performs the web-based search including search terms that relate to the particular location. In a specific example, for instance, the catalyst 202 is a threshold number of photos that were captured at the Grand Canyon. Given this, the recommendation module 138 includes search terms related to the Grand Canyon in the web-based search, such as "Grand Canyon," "Arizona," "desert," etc. In this way, the caption recommendation 304 is related to the particular location.

In implementations in which the catalyst 202 is a significant event, the recommendation module 138 performs a web-based search for a display photo caption including search terms that relate to the significant event. In a specific example, for instance, the catalyst 202 is a graduation ceremony identified based on the user data 122. Given this, the recommendation module 138 includes search terms related to graduation ceremonies in the web-based search, such as "graduation," "cap and gown," etc. In this way, the caption recommendation 304 is related to the significant event.

In some examples, the recommendation module 138 is further configured to leverage facial recognition data to ascertain the identify of one or more individuals depicted in the selected candidate display photo 302 and generate the caption recommendation 304 based on the facial recognition data. To do so, the recommendation module 138 communicates the selected candidate display photo 302 to the social media website 212 with a request for facial recognition data. In response, the social media website 212 communicates, to the recommendation module 138, facial recognition data indicating the names of the connections 210 of the user that are depicted in the selected candidate display photo 302. Additionally or alternatively, the display photo assistant system 120 is equipped with facial recognition functionality. For example, in response to detecting a photo in the photo gallery 124 including a face of an unrecognized individual, the display photo assistant system 120 can prompt the user to provide input of the individual's name. Thus, when an additional photo is detected in the photo gallery 124 including the face of the individual, the display photo assistant system 120 can recognize the individual as having the user provided name.

Given this, the recommendation module 138 can generate a caption that includes the names indicated by the facial recognition data. Consider an example in which the selected candidate display photo 302 includes capture data 126 indicating that the selected candidate display photo 302 was captured at "Hoh Rainforest" and the facial recognition data indicates that the user and an individual named "Lauren" are included in the selected candidate display photo 302. In this example, the recommendation module 138 generates, as the caption recommendation 304, "Exploring Hoh Rainforest with Lauren."

In one or more implementations, the machine learning model 132 is leveraged to determine criteria for display photo captions. To do so, the machine learning model 132 operates in a similar manner to that discussed above with respect to FIG. 2. However, the training data utilized by the machine learning model 132 in implementations for display photo caption recommendations is the display photo captions associated with connections 210 of the user on the social media website 212. In general, the display photo captions are utilized as training data to train the machine learning model 132 to determine criteria for display photo captions that typically lead to high performing social media statistics, such as "likes," "views," "comments," "shares," etc. In various examples, the criteria for display photo captions includes a character count range indicating a number of characters included in captions of high performing display photos, specific emoticons, phrases, words, hashtags that are often included in captions of high performing display photos, whether high performing display photos include quotes or song lyrics, etc.

Therefore, the recommendation module 138 performs the web-based search to identify a number of potential caption recommendations for the selected candidate display photo 302. Further, the recommendation module 138 compares the potential caption recommendations to the criteria for display photo captions. Given this, the recommendation module 138 determines the caption recommendation 304 as the potential caption recommendation that satisfies a highest number of the criteria. In this way, the display photo assistant system 120 automatically generates a caption recommendation 304 that is not only relevant to the selected candidate display photo 302 but is also tailored to trends and tendencies of the user's audience on the social media website 212. Although described with reference to the candidate display photos 214, it is to be appreciated that the recommendation module 138 can generate a caption recommendation 304 for a candidate posting photo selected from the photo gallery 124 without departing from the spirit or scope of the described techniques.

Figure 4A:
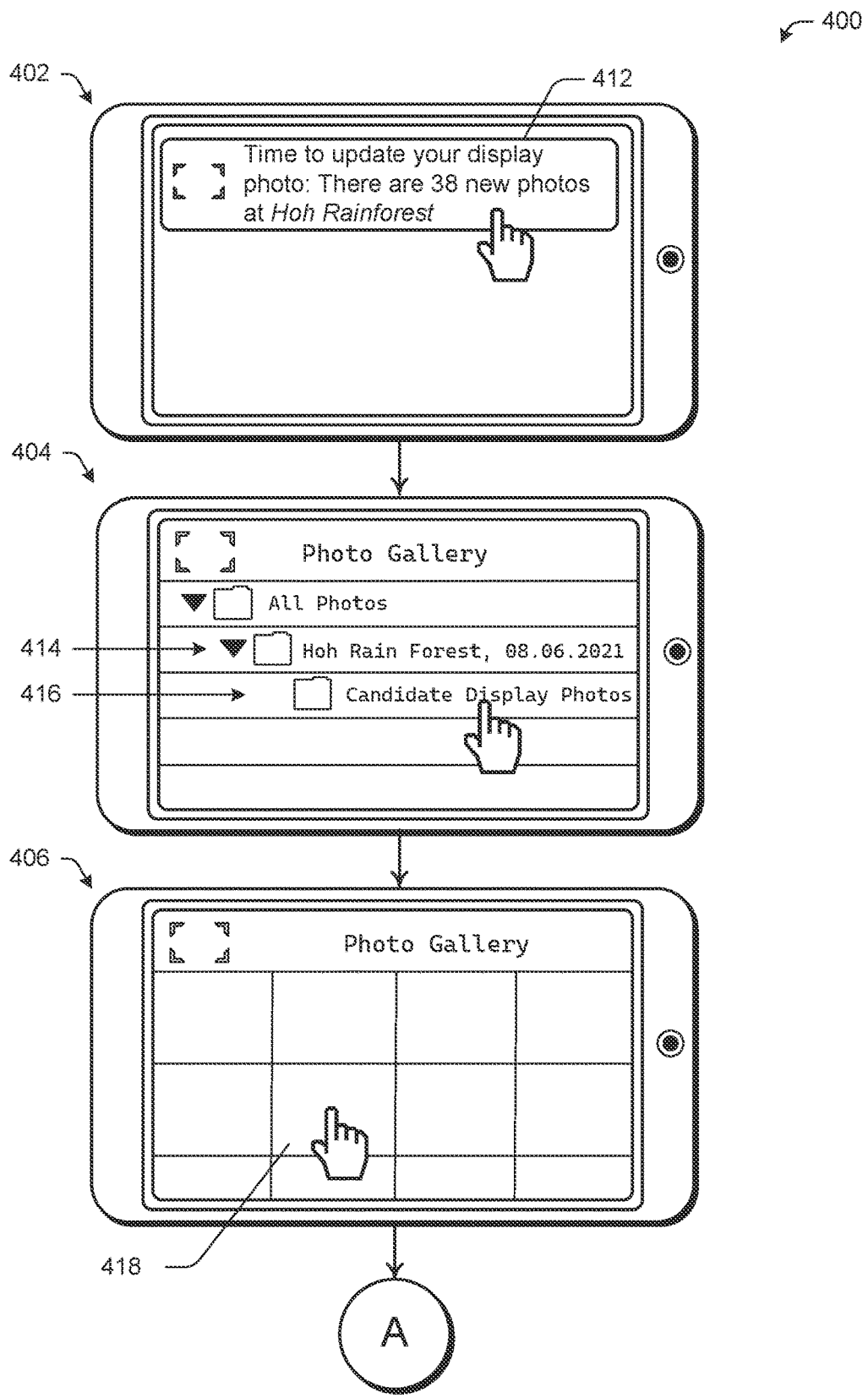
FIGS. 4A and 4B depict an example progression of a user interface implementing the described techniques.
Figure 4B:
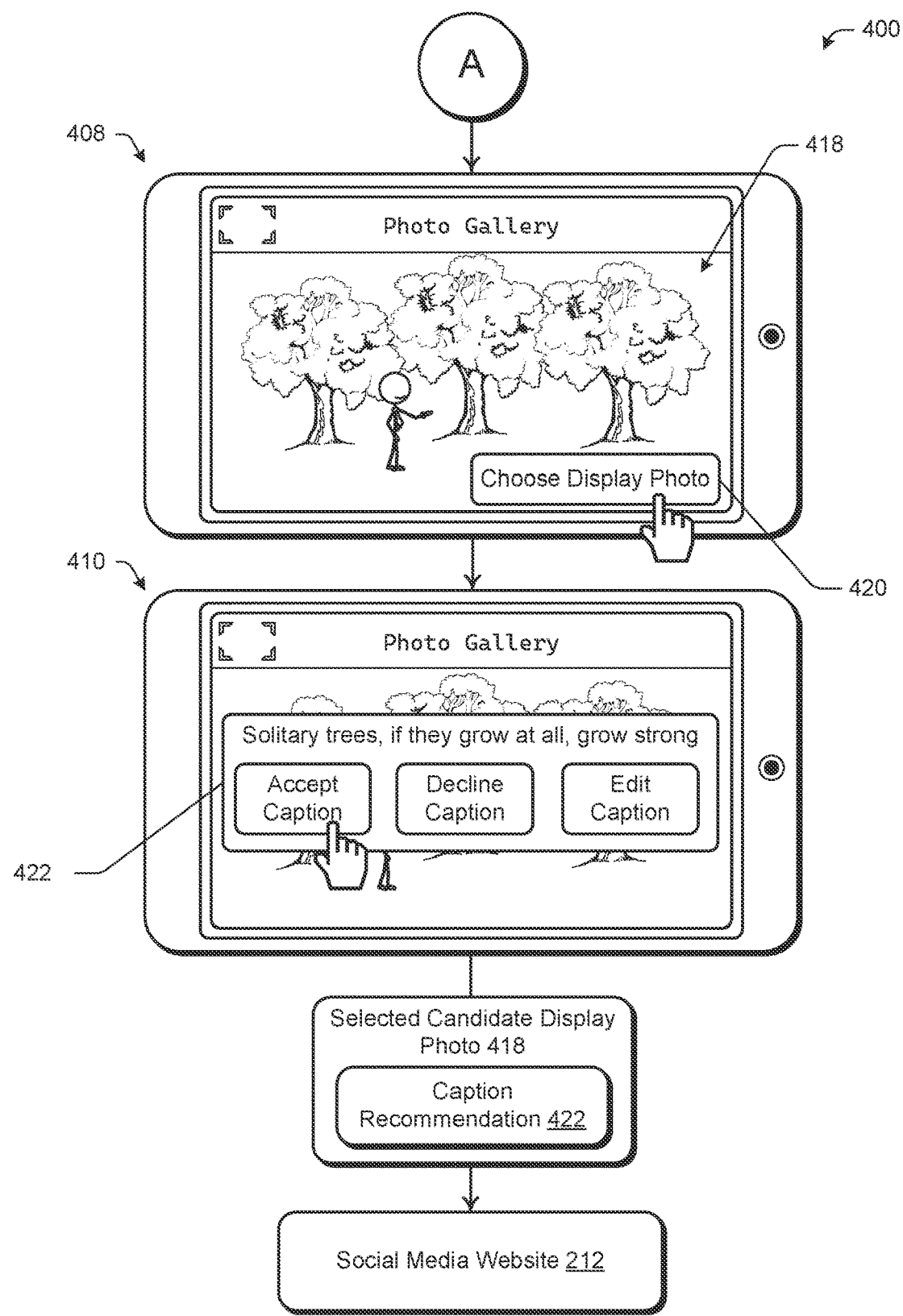

FIGS. 4A and 4B depict an example progression 400 of a user interface implementing the described techniques. As shown, the example progression 400 depicts various stages 402, 404, 406, 408, 410 of the user interface 116 of the computing device 102 implementing techniques for display photo update recommendations. In the example progression 400, the candidate display photo module 134 has identified the candidate display photos 214 in accordance with techniques discussed herein. In the depicted example, the catalyst 202 is a threshold number of photos detected in the photo gallery 124 that were captured at a particular location, e.g., the Hoh Rainforest. In response to outputting the candidate display photos 214 to the photo gallery 124 for maintenance in the sub-folder, the display photo assistant system 120 displays a notification 412 in the user interface 116 of the computing device 102 at stage 402. The notification 412 includes a suggestion prompting the user to update the display photo, as well as an indication of the catalyst 202, i.e., the reason the user may desire to update his or her display photo.

Upon receiving user input selecting the notification 412, the user is navigated to the photo gallery 124 at stage 404. In additional or alternative implementations, the user navigates to the photo gallery 124 without selecting the notification 412, e.g., by selecting an application icon associated with the photo gallery 124. As shown, a folder 414 is created in the photo gallery 124 by the display photo assistant system 120 which includes the collection of photos 204 associated with the catalyst 202, e.g., the photos captured at Hoh Rainforest. Notably, the folder 414 is titled automatically by the display photo assistant system 120 based on the catalyst 202. As further shown at stage 404, the photo gallery 124 includes a sub-folder 416 of the folder 414 that includes the candidate display photos 214 identified from the collection of photos 204.

In response to receiving user input selecting the sub-folder 416 of the candidate display photos 214, the candidate display photos 214 are displayed in the user interface 116 of the computing device at stage 406. The display photo assistant system 120 further receives user input selecting a candidate display photo 418 from the candidate display photos 214. In response, the display photo assistant system 120 displays the selected candidate display photo 418 in a full-screen view at stage 408 along with a user interface element 420 that is selectable to choose the selected candidate display photo 418 as the user's display photo on the social media website 212.

Upon receiving user input selecting the user interface element 420, the recommendation module 138 automatically and without further user input generates a caption recommendation 422 for display in the user interface 116 at stage

410. By way of example, the recommendation module 138 generates the caption recommendation 422 by performing a web-based search including search terms relating to the catalyst 202, e.g., search terms relating to Hoh Rainforest, such as "trees," "rainforest," etc. As shown, the recommended caption determined is a famous quote relating to "trees."

Notably, the caption recommendation 422 includes a user interface element to decline use of the recommended caption with the selected candidate display photo 418. Upon receiving user input selecting the "Decline Caption" user interface element, the display photo assistant system 120 outputs the selected candidate display photo 418 without the recommended caption to the social media website 212 for upload as the user's display photo. Moreover, the caption recommendation 422 includes a user interface element to accept use of the recommended caption with the selected candidate display photo 418. In response to receiving user input selecting the "Accept Caption" user interface element, the display photo assistant system 120 outputs the selected candidate display photo 418 including the caption recommendation 422 to the social media website 212 for upload as the user's display photo and corresponding caption. Furthermore, the caption recommendation 422 includes a user interface element to edit the recommended caption. In response to receiving user input selecting the "Edit Caption" user interface element, the display photo assistant system 120 receives user input to modify the recommended caption and outputs the selected candidate display photo 418 including the caption recommendation 422 as modified by the user input to the social media website 212 for upload as the user's display photo and corresponding caption. In this way, the user can quickly alter the recommended caption in a desired manner.

Figure 5:
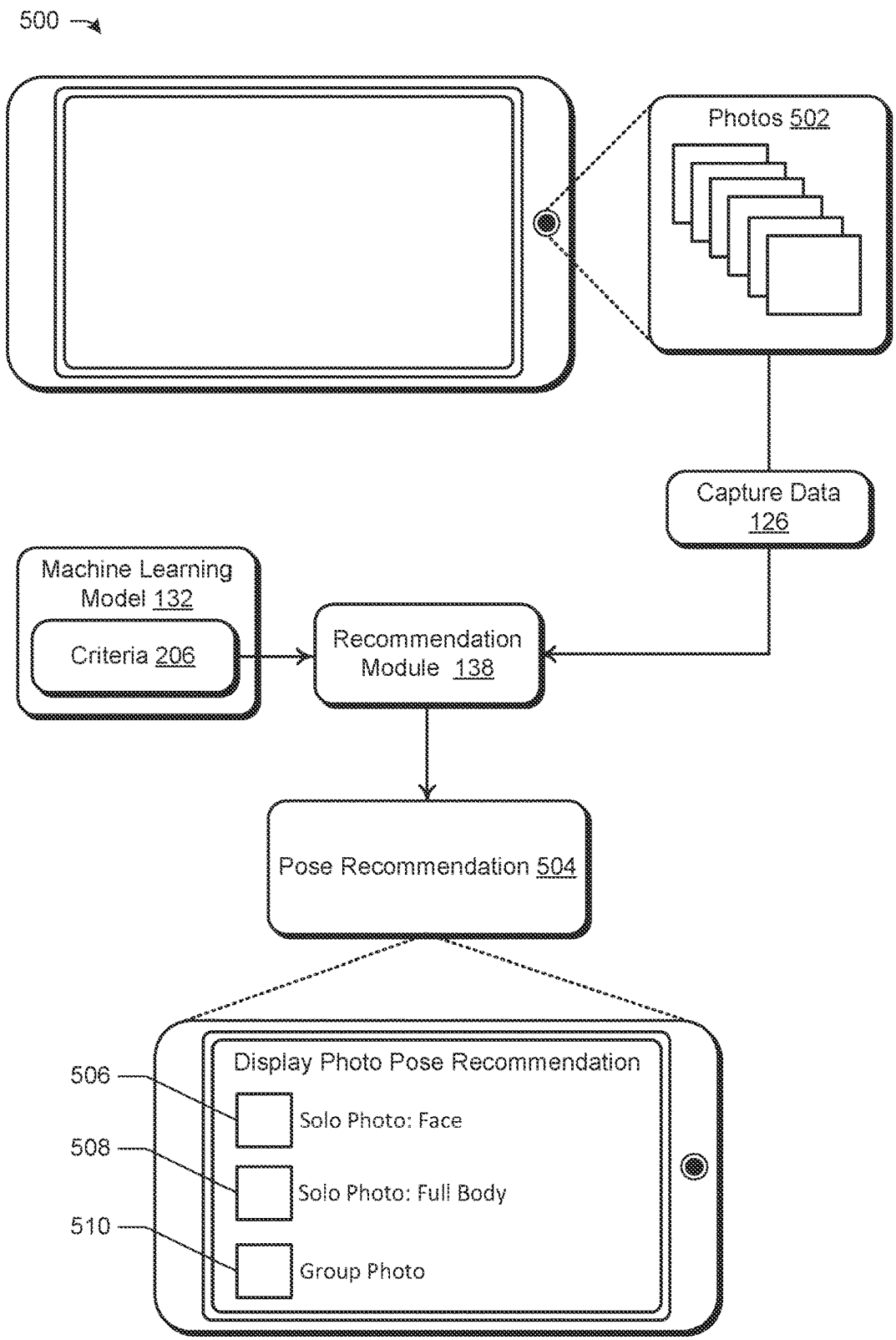
FIG. 5 depicts an example implementation for generating a pose recommendation in accordance with the described techniques.

FIG. 5 depicts an example implementation 500 for generating a pose recommendation in accordance with the described techniques. In one or more implementations, the recommendation module 138 determines that a photo capturing session is taking place using the camera(s) 112 of the computing device 102. By way of example, the recommendation module 138 receives an indication that a threshold number of photos 502 were captured by the camera(s) 112 of the computing device 102 within a particular time period preceding a current point in time, e.g., indicating that the threshold number of photos 502 were captured by the camera(s) 112 within the last five minutes.

Based on the determination that the photo capturing session is currently taking place, the recommendation module 138 is configured to generate a pose recommendation 504 based on the capture data 126 associated with the photos 502 and the criteria 206 for display photos. To do so, the recommendation module 138 obtains the capture data 126 associated with the photos 502 from the memory 118 of the computing device 102 and/or the remote database 104. Further, the recommendation module 138 receives human pose criteria 206 as determined by the machine learning model 132 that is specific to the capture data 126 of the photos 502. In this way, the recommendation module 138 can output a pose recommendation 504 for display in the user interface 116 recommending a pose that is specific to the type of photo being captured during the photo capturing session and which embodies the human pose criteria 206.

In one example, capture data 126 indicates that the photos 502 were captured by a front-facing camera 112 of the computing device 102 and depict only a single human figure. Given this, the recommendation module 138 determines that the user is currently capturing self-portrait photos, e.g., "selfies." Based on the determination, the machine learning model 132 is leveraged to retrieve the display photos 208 associated with the connections 210 of the user on the social media website 212 that depict only one human figure and are captured with a front-facing camera. Further, the machine learning model 132 learns human pose criteria 206 associated with high performing self-portrait display photos of the user's connections 210 on the social media website 212. As such, the recommendation module 138 outputs a display photo pose recommendation 504 for display in the user interface 116 that includes a recommendation 506 for self-portrait photos. In at least one implementation, the recommendation 506 is selectable to display a display photo 208 of a connection 210 of the user that embodies the human pose criteria 206 for self-portrait display photos and/or text describing the criteria 206.

In another example, the capture data 126 indicates that the photos 502 were captured by a rear-facing camera 112 of the computing device 102 and depict only a single human figure. Given this, the recommendation module 138 determines that the user is currently capturing solo photos depicting the user's full body. Based on the determination, the machine learning model 132 is leveraged to retrieve the display photos 208 associated with the connections 210 of the user on the social media website 212 that depict only one human figure and are captured with a rear-facing camera. Using the retrieved display photos 208, the machine learning model 132 learns human pose criteria 206 associated with high performing display photos that depict only one human figure and are captured with a rear-facing camera. As such, the recommendation module 138 outputs a display photo pose recommendation 504 for display in the user interface 116 that includes a recommendation 508 for solo photos depicting the user's full body. In at least one implementation, the recommendation 508 is selectable to display a display photo 208 of a connection 210 of the user that embodies the human pose criteria 206 for solo, full body photos and/or text describing the criteria 206.

In yet another example, the capture data 126 indicates that the photos 502 were captured by a rear-facing camera 112 of the computing device 102 and depict multiple human figures. Given this, the recommendation module 138 determines that the user is currently capturing group photos. Based on the determination, the machine learning model 132 is leveraged to retrieve the display photos 208 associated with the connections 210 of the user on the social media website 212 that depict multiple human figures and are captured with a rear-facing camera. Using the retrieved display photos 208, the machine learning model 132 learns human pose criteria 206 associated with high performing display photos that depict multiple human figures and are captured with a rear-facing camera. As such, the recommendation module 138 outputs a display photo pose recommendation 504 for display in the user interface 116 that includes a recommendation 510 for group photos. In at least one implementation, the recommendation 510 is selectable to display a display photo 208 of a connection 210 of the user that embodies the human pose criteria 206 for group photos and/or text describing the criteria 206. Accordingly, the display photo assistant system 120 is configured to automatically determine that a photo capturing session is taking place via the computing device 102 and recommend poses for display photos that are relevant to the photos 502 being captured during the photo capturing session and which are tailored to a user's audience on the social media website 212.

Figure 6:
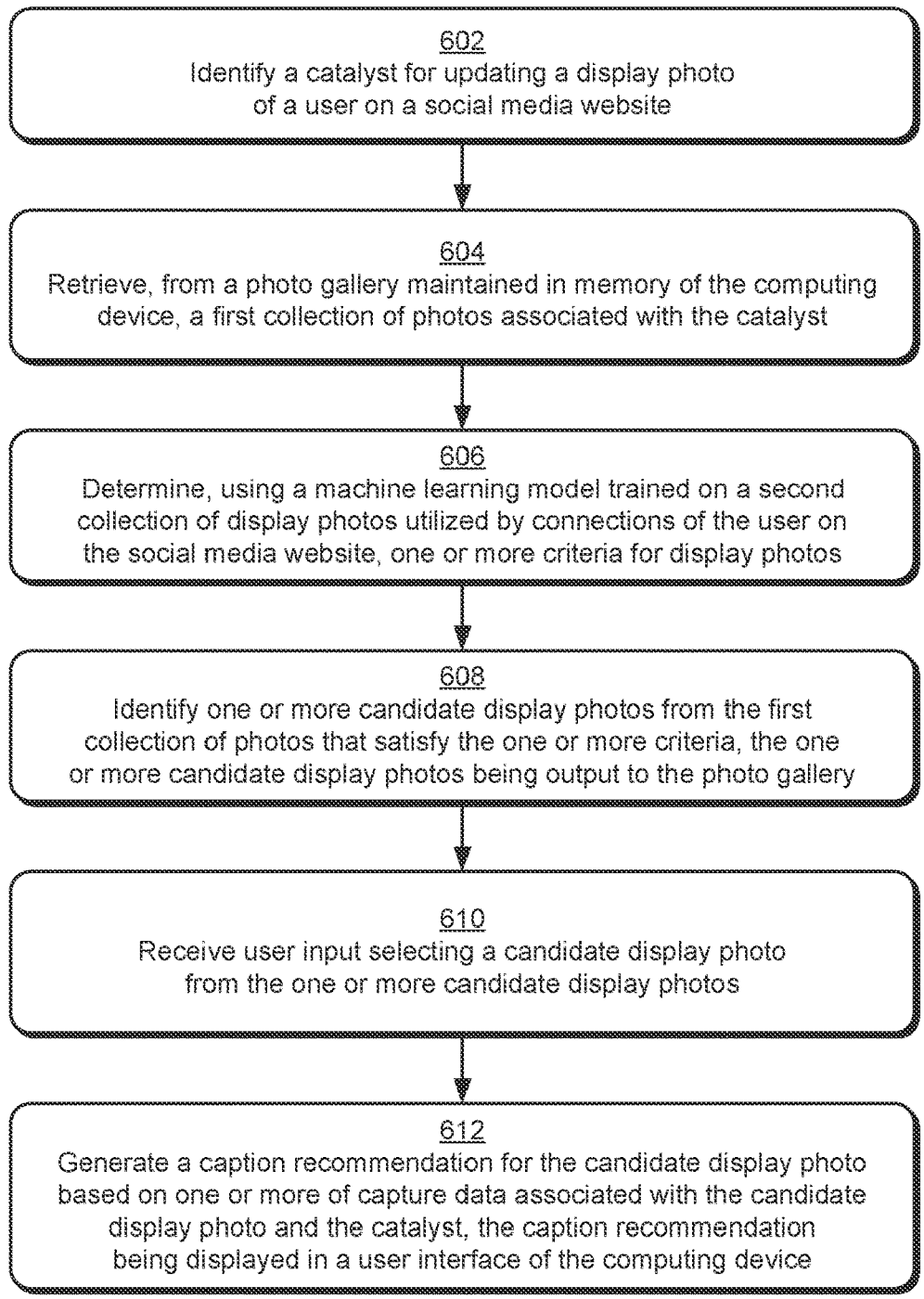
FIG. 6 depicts an example procedure for display photo update recommendations in accordance with one or more implementations.

FIG. 6 depicts an example procedure 600 for display photo update recommendations in accordance with one or more implementations. Procedure 600 is carried out by a computing device, such as computing device 102 of FIG. 1, and can be implemented in software, firmware, hardware, or combinations thereof. Process 600 is shown as a set of acts and is not limited to the order shown for performing the operations of the various acts.

At 602, a catalyst is identified for updating a display photo of a user on a social media website. By way of example, the catalyst identification module 128 identifies the catalyst 202 for updating a display photo of the user on the social media website 212. At 604, a first collection of photos associated with the catalyst is retrieved from a photo gallery maintained in memory of the computing device. By way of example, the catalyst identification module 128 retrieves the first collection of photos 204 from the photo gallery 124 maintained in the memory 118 of the computing device 102. Notably, the first collection of photos 204 is related to or associated with the catalyst 202. In one specific example, for instance, the catalyst 202 is a threshold number of photos detected in the photo gallery 124 that were captured during a particular time period, and as such, the first collection of photos 204 includes photos captured during the particular time period.

At 606, one or more criteria for display photos are determined using a machine learning model trained on a second collection of display photos utilized by connections of the user on the social media website. By way of example, the machine learning model 132 retrieves the second collection of display photos 208 utilized by connections 210 of the user on the social media website 212. In general, the second collection of display photos 208 are used as training data to train the machine learning model 132 to determine the criteria 206 for display photos that perform well on the social media website 212. Any one of a variety of a variety of machine learning aspects can be utilized by the machine learning model 132 to determine the criteria 206, including but not limited to neural networks, deep learning models, reinforcement learning models, machine learning scoring models, etc. In one specific example, the machine learning model 132 is a machine learning scoring algorithm that scores attributes of the display photos 208 based on social media statistics, e.g., a number of "likes," "views," "shares," "comments," etc.

At 608, one or more candidate display photos that satisfy the one or more criteria are identified from the first collection of photos, the one or more candidate display photos being output to the photo gallery. By way of example, the candidate display photo module 134 identifies the candidate display photos 214 from the first collection of photos 204 that satisfy the criteria 206. To do so, the candidate display photo module 134 compares the capture data 126 associated with the individual photos in the first collection of photos 204 to the criteria 206. In one example, the candidate display photo module 134 identifies the candidate display photos 214 as the individual photos in the first collection of photos 204 that satisfy at least a threshold number of the criteria 206. The candidate display photo module 134 is further configured to output the candidate display photos 214 to the photo gallery 124 for storage. For example, the first collection of photos 204 are grouped and stored in a folder 414 of the photo gallery 124 that is titled based on the catalyst 202, and the candidate display photos 214 are grouped and stored in a sub-folder 416 of the folder 414.

At 610, user input is received selecting a candidate display photo from the one or more candidate display photos. By way of example, upon navigating to the sub-folder of candidate display photos 214 in the photo gallery 124, the user provides input selecting one of the candidate display photos 214 to be the updated display photo of the user on the social media website 212, e.g., by selecting the user interface element 420.

At 612, a caption recommendation for the candidate display photo is generated based on one or more of capture data associated with the candidate display photo and the catalyst, the caption recommendation being displayed in a user interface of the computing device. By way of example, the recommendation module 138 generates a caption recommendation 304 by performing a web-based search for display photo captions that include search terms relating to any one or a combination of the catalyst 202, the user data 122 associated with the user, and the capture data 126 associated with the selected candidate display photo 302. The recommendation module 138 further outputs the caption recommendation 304 for display in the user interface 116 of the computing device 102. The caption recommendation 304 includes user interface elements that are selectable to either accept the recommended caption for use with the selected display photo 302 or decline the recommended caption for use with the selected display photo 302.

Figure 7:
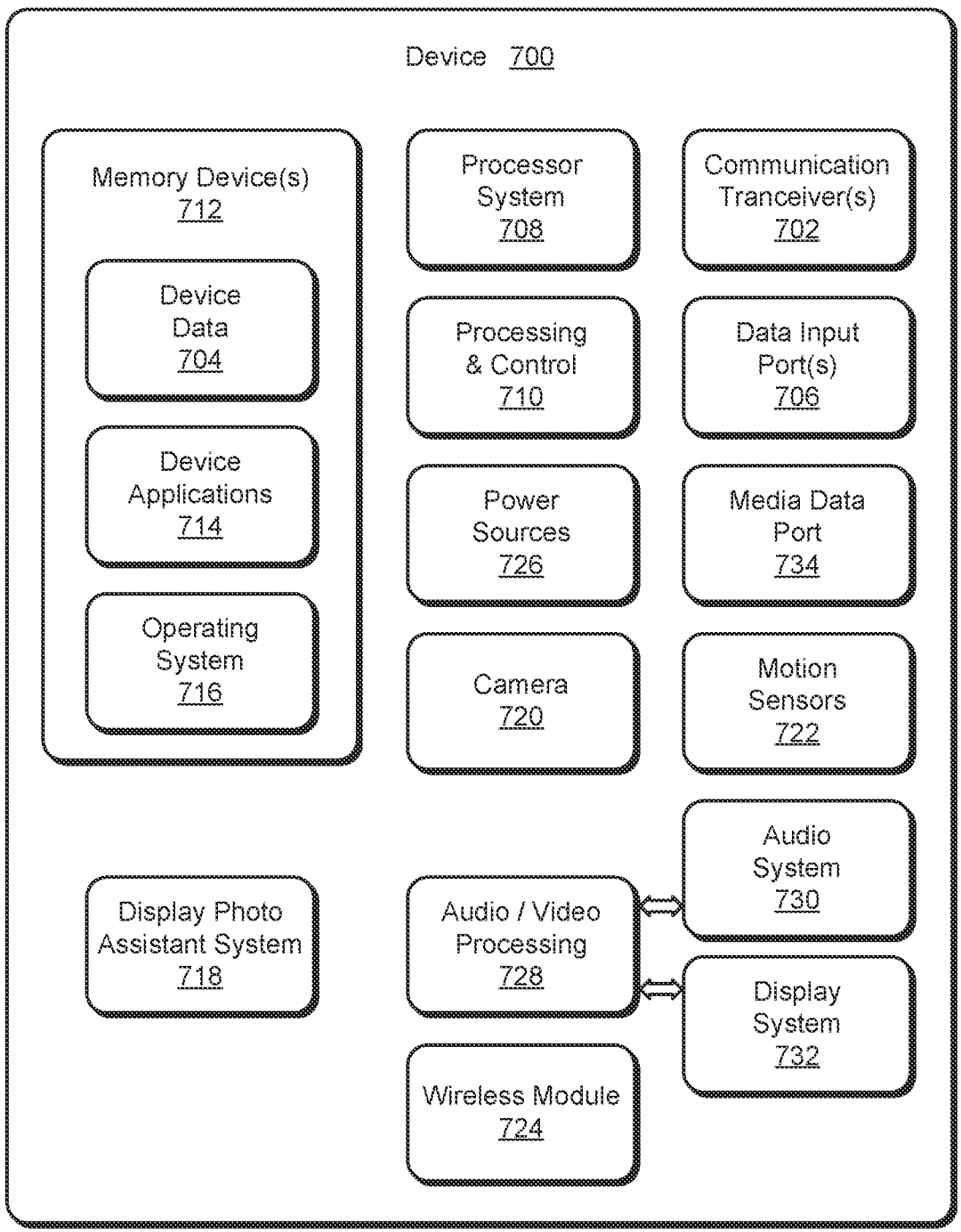
FIG. 7 illustrates various components of an example device that can implement aspects of display photo update recommendations.

FIG. 7 illustrates various components of an example device 700 that can implement aspects of display photo update recommendations. The example device 700 can be implemented as any of the devices described with reference to the previous FIGS. 1-6, such as any type of mobile device, mobile phone, mobile device, wearable device, tablet, computing, communication, entertainment, gaming, media playback, and/or other type of electronic device. For example, the computing device 102 as shown and described with reference to FIGS. 1-6 may be implemented as the example device 700.

The device 700 includes communication transceivers 702 that enable wired and/or wireless communication of device data 704 with other devices. The device data 704 can include any of device identifying data, device location data, wireless connectivity data, and wireless protocol data. Additionally, the device data 704 can include any type of audio, video, and/or image data. Example communication transceivers 702 include wireless personal area network (WPAN) radios compliant with various IEEE 1102.15 (Bluetooth™) standards, wireless local area network (WLAN) radios compliant with any of the various IEEE 1102.11 (Wi-Fi™) standards, wireless wide area network (WWAN) radios for cellular phone communication, wireless metropolitan area network (WMAN) radios compliant with various IEEE 1102.16 (WiMAX™) standards, and wired local area network (LAN) Ethernet transceivers for network data communication.

The device 700 may also include one or more data input ports 706 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 700 includes a processing system 708 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 710. The device 700 may further include any type of a system bus or other data and command transfer system that couples the various components within the device. A system bus can include any one or combination of different bus structures and architectures, as well as control and data lines.

The device 700 also includes computer-readable storage memory 712 (e.g., memory devices) that enable data storage, such as data storage devices that can be accessed by a computing device, and that provide persistent storage of data and executable instructions (e.g., software applications, programs, functions, and the like). Examples of the computer-readable storage memory 712 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 700 may also include a mass storage media device.

The computer-readable storage memory 712 provides data storage mechanisms to store the device data 704, other types of information and/or data, and various device applications 714 (e.g., software applications). For example, an operating system 716 can be maintained as software instructions with a memory device and executed by the processing system 708. The device applications 714 may also include a device manager, such as any form of a control application, software application, signal-processing and control module, code that is native to a particular device, a hardware abstraction layer for a particular device, and so on. Computer-readable storage memory 712 represents media and/or devices that enable persistent and/or non-transitory storage of information in contrast to mere signal transmission, carrier waves, or signals per se. Computer-readable storage memory 712 do not include signals per se or transitory signals.

In this example, the device 700 includes a display photo assistant system 718 that implements aspects of display photo update recommendations and may be implemented with hardware components and/or in software as one of the device applications 714. In an example, the display photo assistant system 718 can be implemented as the display photo assistant system 120 described in detail above. In implementations, the display photo assistant system 718 may include independent processing, memory, and logic components as a computing and/or electronic device integrated with the device 700.

In this example, the example device 700 also includes a camera 720 and motion sensors 722, such as may be implemented in an inertial measurement unit (IMU). The motion sensors 722 can be implemented with various sensors, such as a gyroscope, an accelerometer, and/or other types of motion sensors to sense motion of the device. The various motion sensors 722 may also be implemented as components of an inertial measurement unit in the device.

The device 700 also includes a wireless module 724, which is representative of functionality to perform various wireless communication tasks. For instance, for the computing device 102, the wireless module 724 can be leveraged to scan for and detect wireless networks, as well as negotiate wireless connectivity to wireless networks for the computing device 102. The device 700 can also include one or more power sources 726, such as when the device is implemented as a mobile device. The power sources 726 may include a charging and/or power system, and can be implemented as a flexible strip battery, a rechargeable battery, a charged super-capacitor, and/or any other type of active or passive power source.

The device 700 also includes an audio and/or video processing system 728 that generates audio data for an audio system 730 and/or generates display data for a display system 732. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 734. In implementations, the audio system and/or the display system are integrated components of the example device. Alternatively, the audio system and/or the display system are external, peripheral components to the example device.

Although implementations of display photo update recommendations have been described in language specific to features and/or methods, the subject of the appended claims is not necessarily limited to the specific features or methods described. Rather, the features and methods are disclosed as example implementations of display photo update recommendations, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

In some aspects, the techniques described herein relate to a method comprising: identifying a catalyst for updating a display photo of a user on a social media website; retrieving, from a photo gallery maintained in memory of a computing device, a first collection of photos associated with the catalyst; determining, using a machine learning model trained on a second collection of display photos utilized by connections of the user on the social media website, one or more criteria for display photos; and identifying one or more candidate display photos from the first collection of photos that satisfy the one or more criteria, the one or more candidate display photos being output to the photo gallery.

In some aspects, the techniques described herein relate to a method, wherein identifying the catalyst includes detecting a threshold number of photos in the photo gallery captured during a particular time period, and the first collection of photos includes individual photos that were captured during the particular time period.

In some aspects, the techniques described herein relate to a method, wherein identifying the catalyst includes detecting a threshold number of photos in the photo gallery captured at a particular location, and the first collection of photos includes individual photos that were captured at the particular location.

In some aspects, the techniques described herein relate to a method, wherein identifying the catalyst includes determining that a threshold amount of time has passed since the user last updated the display photo, and the first collection of photos includes individual photos that were captured during the threshold amount of time.

In some aspects, the techniques described herein relate to a method, wherein identifying the catalyst includes identifying, based on user data maintained in the memory, a significant event associated with the user.

In some aspects, the techniques described herein relate to a method, wherein identifying the catalyst includes: determining, using the machine learning model trained on a third collection of display photos utilized by the connections of the user on the social media website and at a subsequent time, one or more updated criteria for display photos; and determining that the display photo of the user does not satisfy the one or more updated criteria.

In some aspects, the techniques described herein relate to a method, further comprising identifying one or more additional candidate display photos that satisfy the one or more updated criteria, the one or more additional candidate display photos being output to the photo gallery.

In some aspects, the techniques described herein relate to a method, wherein identifying the one or more candidate display photos includes comparing capture data associated with individual photos in the first collection of photos to the one or more criteria.

In some aspects, the techniques described herein relate to a method, wherein the capture data includes one or more of: configuration settings used by a camera that captured a respective individual photo, including one or more of device orientation, camera orientation, and brightness settings; and time and location information associated with the respective individual photo, including one or more of a geolocation, a time of day, a date, and weather conditions associated with the respective individual photo.

In some aspects, the techniques described herein relate to a method, further comprising: receiving user input selecting a candidate display photo from the one or more candidate display photos; and generating a caption recommendation for the candidate display photo based on one or more of the capture data associated with the candidate display photo and the catalyst, the caption recommendation being displayed in a user interface of the computing device.

In some aspects, the techniques described herein relate to a computing device comprising: a memory to maintain a photo gallery associated with a user; and a display photo assistant system, implemented at least partially in hardware, to: identify a catalyst for updating a display photo of the user on a social media website; retrieve, from the photo gallery, a first collection of photos associated with the catalyst; determine, using a machine learning model trained on a second collection of display photos utilized by connections of the user on the social media website, one or more criteria for display photos; and identify one or more candidate display photos from the first collection of photos that satisfy the one or more criteria, the one or more candidate display photos being output to the photo gallery.

In some aspects, the techniques described herein relate to a computing device, wherein, to identify the one or more candidate display photos, the display photo assistant system is further configured to: retrieve, from the memory, capture data associated with individual photos in the first collection of photos; and compare the capture data to the one or more criteria.

In some aspects, the techniques described herein relate to a computing device, wherein the capture data includes one or more of: configuration settings used by a camera that captured a respective individual photo, including one or more of device orientation, camera orientation, and brightness settings; and time and location information associated with the respective individual photo, including one or more of a geolocation, a time of day, a date, and weather conditions associated with the respective individual photo.

In some aspects, the techniques described herein relate to a method comprising: identifying a catalyst for updating a display photo of a user on a social media website; determining, using a machine learning model trained on a collection of display photos utilized by connections of the user on the social media website, one or more criteria for display photos; identifying, from a photo gallery maintained in memory of a computing device, one or more candidate display photos associated with the catalyst that satisfy the one or more criteria, the one or more candidate display photos being output to the photo gallery; receiving user input selecting a candidate display photo from the one or more candidate display photos; and generating a caption recommendation for the candidate display photo based on one or more of capture data associated with the candidate display photo and the catalyst, the caption recommendation being displayed in a user interface of the computing device.

In some aspects, the techniques described herein relate to a method, wherein the capture data includes one or more of: configuration settings used by a camera that captured the candidate display photo, including one or more of device orientation, camera orientation, and brightness settings; and time and location information associated with the candidate display photo, including one or more of a geolocation, a time of day, a date, and weather conditions associated with the candidate display photo.

In some aspects, the techniques described herein relate to a method, wherein: identifying the catalyst includes detecting a threshold number of photos in the photo gallery that were captured during a particular time period, and generating the caption recommendation includes identifying, based on user data maintained in the memory, a significant event associated with the user during the particular time period, the caption recommendation being based on the significant event.

In some aspects, the techniques described herein relate to a method, wherein identifying the catalyst includes detecting a threshold number of photos in the photo gallery captured at a particular location, and the caption recommendation is generated based on the particular location.

In some aspects, the techniques described herein relate to a method, wherein identifying the catalyst includes identifying, based on user data maintained in the memory, a significant event associated with the user, the caption recommendation being based on the significant event.

In some aspects, the techniques described herein relate to a method, wherein generating the caption recommendation includes automatically performing a web-based search including search terms that are based on one or more of the capture data and the catalyst responsive to receiving the user input.

In some aspects, the techniques described herein relate to a method, further comprising: receiving an indication that a threshold number of photos were captured by a camera of the computing device during a particular time period;

accessing additional capture data associated with the threshold number of photos; and displaying, in the user interface of the computing device, a pose recommendation based on the additional capture data and the one or more criteria.

The invention claimed is:

1. A method comprising:
   determining, using a machine learning model trained on a first collection of display photos utilized by connections of a user on a social media website, one or more criteria for display photos;
   identifying a catalyst for updating a display photo of the user on the social media website, wherein identifying the catalyst includes one or more of:
      detecting a threshold number of photos in a photo gallery captured during a particular time period;
      detecting a threshold number of photos in the photo gallery captured at a particular location;
      determining that a threshold amount of time has passed since the user last updated the display photo; or
      determining that the display photo of the user does not satisfy the one or more criteria;
   retrieving, from the photo gallery, a second collection of photos associated with the catalyst; and
   identifying one or more candidate display photos from the second collection of photos that satisfy the one or more criteria, the one or more candidate display photos being output to the photo gallery.

2. The method of claim 1, wherein the second collection of photos includes individual photos that were captured during the particular time period.

3. The method of claim 1, wherein the second collection of photos includes individual photos that were captured at the particular location.

4. The method of claim 1, wherein the second collection of photos includes individual photos that were captured during the threshold amount of time.

5. The method of claim 1, wherein identifying the catalyst includes identifying, based on user data of the user, a significant event associated with the user.

6. The method of claim 1, wherein identifying the catalyst includes:
   determining, using the machine learning model trained on a third collection of display photos utilized by the connections of the user on the social media website and at a subsequent time, one or more updated criteria for display photos; and
   determining that the display photo of the user does not satisfy the one or more updated criteria.

7. The method of claim 6, further comprising identifying one or more additional candidate display photos that satisfy the one or more updated criteria, the one or more additional candidate display photos being output to the photo gallery.

8. The method of claim 1, wherein identifying the one or more candidate display photos includes comparing capture data associated with individual photos in the second collection of photos to the one or more criteria.

9. The method of claim 8, wherein the capture data includes one or more of:
   configuration settings used by a camera that captured a respective individual photo, including one or more of device orientation, camera orientation, and brightness settings; and
   time and location information associated with the respective individual photo, including one or more of a geolocation, a time of day, a date, and weather conditions associated with the respective individual photo.

10. The method of claim 9, further comprising:
    receiving user input selecting a candidate display photo from the one or more candidate display photos; and
    generating a caption recommendation for the candidate display photo based on one or more of the capture data associated with the candidate display photo or the catalyst, the caption recommendation being displayed in a user interface.

11. The method of claim 10, wherein generating the caption recommendation includes identifying, based on user data of the user, a significant event associated with the user during the particular time period, the caption recommendation being based on the significant event.

12. The method of claim 10, wherein the caption recommendation is based on the particular location.

13. The method of claim 10, wherein generating the caption recommendation includes automatically performing a web-based search including search terms that are based on one or more of the capture data or the catalyst responsive to receiving the user input.

14. A computing device comprising:
    at least one memory to maintain a photo gallery associated with a user; and
    at least one processor coupled with the at least one memory and configured to cause the computing device to:
       identify, as a catalyst for updating a display photo of the user on a social media website, a threshold number of photos in the photo gallery captured during a particular time period;
       retrieve, from the photo gallery, a first collection of photos captured during the particular time period;
       determine, using a machine learning model trained on a second collection of display photos utilized by connections of the user on the social media website, one or more criteria for display photos; and
       identify one or more candidate display photos from the first collection of photos that satisfy the one or more criteria, the one or more candidate display photos being output to the photo gallery.

15. The computing device of claim 14, wherein the at least one processor is configured to cause the computing device to:
    retrieve, from the at least one memory, capture data associated with individual photos in the first collection of photos; and
    compare the capture data to the one or more criteria.

16. The computing device of claim 15, wherein the capture data includes one or more of:
    configuration settings used by a camera that captured a respective individual photo, including one or more of device orientation, camera orientation, and brightness settings; and
    time and location information associated with the respective individual photo, including one or more of a geolocation, a time of day, a date, and weather conditions associated with the respective individual photo.

17. The computing device of claim 14, wherein the at least one processor is further configured to cause the computing device to:
    access capture data associated with the first collection of photos; and
    display, in a user interface, a pose recommendation based on the capture data and the one or more criteria.

18. The computing device of claim 14, wherein the at least one processor is further configured to cause the computing device to:

receive user input selecting a candidate display photo from the one or more candidate display photos; and generate a caption recommendation based on capture data associated with the candidate display photo.

19. A system comprising:

at least one memory to maintain a photo gallery associated with a user; and at least one processor coupled with the at least one memory and configured to cause the system to:

identify, as a catalyst for updating a display photo of the user on a social media website, a threshold number of photos in the photo gallery captured at a particular location;

retrieve, from the photo gallery, a first collection of photos captured at the particular location;

determine, using a machine learning model trained on a second collection of display photos utilized by connections of the user on the social media website, one or more criteria for display photos; and identify one or more candidate display photos from the first collection of photos that satisfy the one or more criteria, the one or more candidate display photos being output to the photo gallery.

20. The system of claim 19, wherein the at least one processor is configured to cause the system to:

receive user input selecting a candidate display photo from the one or more candidate display photos; and generate, for display in a user interface, a caption recommendation for the display photo based on capture data associated with the candidate display photo.

\* \* \* \* \*